2,711,426

N-METHYLSULFONYL-BENZYL-SULFONANILIDES

Robert W. Wynn, Easton, Pa., assignor to General Aniline & Film Corporation, New York, N. Y., a corporation of Delaware No Drawing. Application August 12, 1953,
Serial No. 373,894

6 Claims. (Cl. 260—556)

This invention relates to N-methylsulfonyl-benzyl-sulfonanilides as a new class of synthetic organic insecticides.

Although there are a number of ways in which the control of insect pests may be effectuated, the method most commonly employed involves the use of chemical substances to kill or repel the pests affecting agricultural crops, domestic animals and man. Chemical insecticides are classified according to the method by which they act. Those which kill by direct action on the organism of the insect are designated as contact insecticides; those which act internally after ingestion are designated as stomach poisons, and those which act in the gaseous state are designated as fumigants.

Each of the foregoing classes play an important part in the control of insect pests. For some species of insects, which chew the leaves, flowers, or stems of plants, a stomach poison is usually effective. For those which attack man or animals, or which suck the sap of plants, contact insecticides are most frequently used.

Thousands of synthetic organic compounds have been tested for insecticidal properties but only a few have been sufficiently effective to warrant their use in insect pest control. One of the first synthetic organic compounds to receive wide acceptance as an insecticide is DDT (2,2-bis(p-chlorophenyl) - 1,1,1 - trichloroethane). Of the many relatives of DDT which have been prepared and tested, methoxychlor (2,2-di-p-anisyl-1,1,1-trichloroethane) appears to be toxic to certain species of insects. The gamma isomer of hexachlorocyclohexane (benzene hexachloride), like DDT, is also being used for control of many insects.

In addition to the foregoing polychloro compounds, 1,2,4,5,6,7,8,8 - octachloro - 4,7 - methano - 3a,4,7,7a-tetrahydroindane (Chlordane), aldrin, dieldrin, and chlorinated camphene (Toxaphene), have shown toxicity to insects. One of the new insecticides that came out of the Second World War is chloromethyl-p-chlorophenyl-sulfone. It is a good insecticide but is less effective than DDT against lice, flies, and mosquitoes. An analog of the latter compound, chloromethanesulfonanilide, has been synthesized and tested as an insecticide with poor and unpromising results.

While all of the foregoing polychloro compounds are good insecticides, several of them possess certain shortcomings either per se or in the course of their manufacture. For example, commercial DDT, made by reacting chloral with chlorobenzene in the presence of sulfuric acid, contains about 70–75% of the active principal together with a number of related products which have practically no insecticidal value. In addition, DDT causes toxic manifestations in animals and humans. For this reason formulations of DDT on lactating dairy animals or on forage crops fed to them is not permitted in order to protect the public health. Chlordane, which is highly toxic to insects, is also toxic to higher animals. The isolation of Lindane, i. e., the gamma isomer, requires a costly procedure to separate it from a mixture of 5 isomers. The gamma isomer comprises about 12.5% of crude hexachlorocyclohexane. Because of its odor and the off-flavor it imparts to certain food products, technical hexachlorocyclohexane is limited in use.

It is an object of the present invention to provide a new class of insecticides which are effectively utilized in the formulation of residual sprays and dusts.

It is a further object to provide insecticides which are readily and cheaply prepared in practically pure form and which are far more toxic to certain species of insects and less toxic to higher animals than DDT.

I have discovered that by condensing a sodio chloromethanesulfon-(mono- or poly-chloro)anilide or a sodio methanesulfon-(mono- or poly-chloro)anilide with an unsubstituted or chloro substituted benzylsulfonyl chloride a new class of compounds are obtained which are highly toxic to insects and which are characterized by the following general formula:

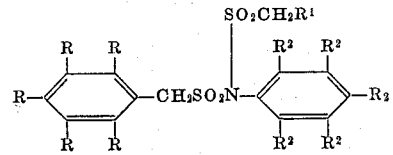

wherein R, $R^1$ and $R^2$ represent either hydrogen or chlorine and where at least one R and one $R^2$ represent chlorine.

In preparing the compounds having the above formula, one molecular equivalent of a chloromethanesulfon-(mono- or poly-chloro)anilide or one molecular equivalent of a methanesulfon-(mono- or poly-chloro)anilide is treated, in the conventional manner, with one molecular equivalent of metallic sodium dissolved in ethanol and the ethanol solution evaporated to dryness to recover the residue, i. e., sodium salt. One molecular equivalent of the sodium salt is then suspended in benzene and one molecular equivalent of benzylsulfonyl chloride or a mono- or poly-chlorobenzylsulfonyl chloride dissolved in benzene is added dropwise with stirring at room temperature. The mixture is refluxed for about 2 hours and the precipitated salt filtered off and the benzene evaporated off on the steam bath. The solid residue may be crystallized once or twice from methanol.

As examples of sodio chloromethanesulfon-(mono-chloro and poly-chloro)anilides and sodio methanesulfon-(mono-chloro and poly-chloro)anilides which are condensed with the benzylsulfonyl chloride or a mono- or poly-chlorobenzylsulfonyl chloride the following are illustrative:

Sodio chloromethanesulfon-2-chloroanilide
Sodio chloromethanesulfon-3-chloroanilide
Sodio chloromethanesulfon-2,3-dichloroanilide
Sodio chloromethanesulfon-2,4-dichloroanilide
Sodio chloromethanesulfon-2,5-dichloroanilide
Sodio chloromethanesulfon-2,6-dichloroanilide
Sodio chloromethanesulfon-3,4-dichloroanilide
Sodio chloromethanesulfon-3,5-dichloroanilide
Sodio chloromethanesulfon-2,3,4-trichloroanilide
Sodio chloromethanesulfon-2,3,5-trichloroanilide
Sodio chloromethanesulfon-2,3,6-trichloroanilide
Sodio chloromethanesulfon-2,4,5-trichloroanilide
Sodio chloromethanesulfon-3,4,5-trichloroanilide
Sodio chloromethanesulfon-2,3,4,5-tetrachloroanilide
Sodio chloromethanesulfon-2,3,4,6-tetrachloroanilide
Sodio chloromethanesulfon-pentachloroanilide
Sodio methane-2-chloroanilide
Sodio methane-3-chloroanilide
Sodio methane-2,3-dichloroanilide
Sodio methane-2,4-dichloroanilide
Sodio methane-2,5-dichloroanilide
Sodio methane-2,6-dichloroanilide Sodio methane-3,4-dichloroanilide
Sodio methane-3,5-dichloroanilide
Sodio methane-2,3,4-trichloroanilide
Sodio methane-2,3,5-trichloroanilide
Sodio methane-2,3,6-trichloroanilide
Sodio methane-2,4,5-trichloroanilide
Sodio methane-3,4,5-trichloroanilide
Sodio methane-2,3,4,5-tetrachloroanilide
Sodio methane-2,3,4,6-tetrachloroanilide
Sodio methane-pentachloroanilide The chloromethanesulfon-(mono- or poly-chloro)anilides, and the methanesulfon-(mono- or poly-chloro)anilides, employed in preparing the sodium salts, are readily obtained by the procedure outlined in my co-pending application (Serial No. EE-1002), filed on even date.

As examples of benzylsulfonyl chloride and of mono- and poly-chlorobenzylsulfonyl chlorides the following are illustrative:

Benzylsulfonyl chloride
2-chlorobenzylsulfonyl chloride
3-chlorobenzylsulfonyl chloride
4-chlorobenzylsulfonyl chloride
2,3-dichlorobenzylsulfonyl chloride
2,4-dichlorobenzylsulfonyl chloride
2,5-dichlorobenzylsulfonyl chloride
3,4-dichlorobenzylsulfonyl chloride
3,5-dichlorobenzylsulfonyl chloride
2,3,4-trichlorobenzylsulfonyl chloride
2,3,5-trichlorobenzylsulfonyl chloride
2,3,6-trichlorobenzylsulfonyl chloride
2,4,5-trichlorobenzylsulfonyl chloride
2,4,6-trichlorobenzylsulfonyl chloride
3,4,5-trichlorobenzylsulfonyl chloride
2,3,4,5-tetrachlorobenzylsulfonyl chloride
2,3,4,6-tetrachlorobenzylsulfonyl chloride
Pentachlorobenzylsulfonyl chloride The following examples will illustrate how the various species of compounds characterized by the foregoing general formula are prepared. The parts used are by weight unless otherwise stated.

*Example I*

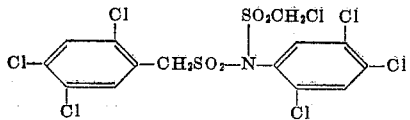

3.63 grams of sodio chloromethanesulfon-2,4,5-trichloroaniline was suspended in 50 cc. of benzene and 3.40 grams of trichlorobenzylsulfonyl chloride dissolved in 25 cc. of benzene was added dropwise with stirring at room temperature. The mixture was slowly heated to reflux and then refluxed for 2 hours. The precipitated salt was filtered off and the solvent evaporated off on the steam bath. The solid residue was recrystallized twice from methanol.

*Example II*

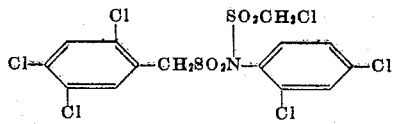

2.74 grams of sodio chloromethanesulfon-2,4-dichloroanilide was suspended in 50 cc. benzene and 3.40 grams trichlorobenzylsulfonyl chloride in 25 cc. benzene was added dropwise at room temperature. The mixture was then refluxed for 2 hours. The precipitated salt was filtered off and the solvent evaporated on the steam bath. The solid residue was recrystallized from methanol.

*Example III*

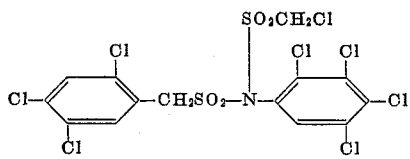

Example I was repeated with the exception that 3.63 grams of sodio chloromethanesulfon-2,4,5 trichloroanilide were replaced by 4.00 grams of sodium chloromethanesulfon-2,3,4,5-tetrachloroanilide.

*Example IV*

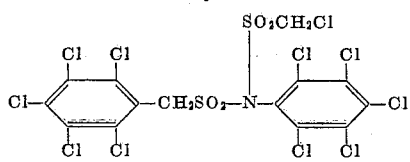

Example I was repeated with the exception that 3.63 grams of sodio chloromethanesulfon-2,4,5 trichloroanilide and 3.40 grams of trichlorobenzylsulfonyl chloride were replaced by 4.0 grams of sodio chloromethanesulfon-pentachloroanilide and 3.6 grams of pentachlorobenzylsufonyl chloride, respectively.

*Example V*

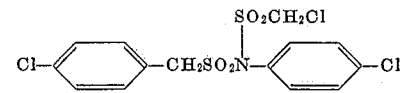

Example I was again repeated with the exception that 3.63 grams of sodio chloromethanesulfon-2,4,5 trichloroanilide and 3.40 grams of trichlorobenzylsulfonyl chloride were replaced by 2.62 grams of sodio chloromethanesulfon-3-chloroanilide and 2.25 grams of 3-chlorobenzylsulfonyl chloride, respectively.

*Example VI*

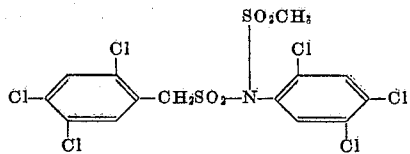

2.75 grams of sodio methanesulfon-2,4,5-trichloroanilide was suspended in 50 cc. of benzene and 2.62 grams of trichlorobenzylsulfonyl chloride dissolved in 25 cc. of benzene was added dropwise with stirring at room temperature. The mixture was slowly heated to reflux and then refluxed for 2 hours. The precipitated salt was filtered off and the solvent evaporated off on the steam bath. The solid residue was recrystallized from methanol.

*Example VII*

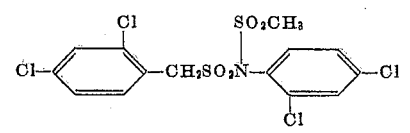

2.50 grams of sodio methanesulfon-2,4-dichloroanilide was suspended in 50 cc. benzene and 2.62 grams of trichlorobenzylsulfonyl chloride in 25 cc. benzene was added dropwise at room temperature. The mixture was then refluxed for 2 hours. The precipitated salt was filtered off and the solvent evaporated on the steam bath. The solid residue was recrystallized from methanol.

*Example VIII*

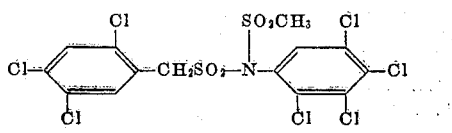

The procedure of Example VI was repeated with the exception that 2.75 grams of sodio methanesulfon-2,4,5-trichloroanilide were replaced by 3.20 grams of sodio methanesulfon-2,3,4,5-tetrachloroanilide.

*Example IX*

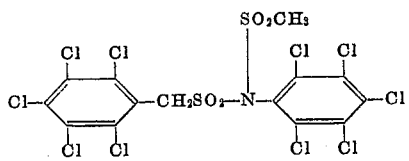

The procedure of Example VI was repeated with the exception that 2.75 grams of sodio methanesulfon-2,4,5-trichloroanilide and 2.62 grams of trichlorobenzylsulfonyl chloride were replaced by 3.50 grams of sodio methanesulfon-pentachloroanilide and 3.30 grams of pentachlorobenzylsulfonyl chloride, respectively.

*Example X*

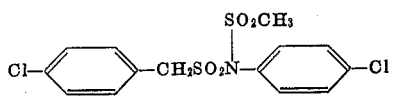

The procedure of Example VI was repeated with the exception that 2.75 grams of sodio methanesulfon-2,4,5-trichloroanilide and 2.62 grams of trichlorobenzylsulfonyl chloride were replaced by 2.10 grams of sodio methanesulfon-3-chloroanilide and 1.93 grams of 3-chlorobenzylsulfonyl chloride, respectively.

It is to be noted that the yields in all of the above examples are substantially quantitative and that one or two, at most, recrystallizations are sufficient to yield a product of high purity.

The white crystalline products of the foregoing examples, including numerous other species of the above general formula, are highly toxic to a variety of insects which came in contact with them, and advantage was taken of this property in the formulation of residual dusts containing 0.3% to 5% of active ingredient with which the screening tests were conducted. The screening tests, which are well known to the art and need not be repeated herein, were applied to the following insects: cigarette beetle, confused flour bettle, India meal moth; fabric pests such as black carpet bettle, furniture carpet bettle and webbing clothes moth; household pests such as flies, fleas, lice, mites and German cockroach, and plant pests such as elm leaf bettle, gladiolus thrips and potato leafhopper, with excellent results. Formulations of wettable powders, suspension sprays, and emulsion sprays each containing 0.3 to 5% by weight of some of the compounds of the foregoing examples were more toxic to the confused flour bettle and the German cockroach than the same powders and sprays containing 0.3 to 5% by weight of DDT.

The formulations in which the compounds of the present invention may be employed are solutions in organic solvents such as toluene, xylene, alkylated naphthalenes or petroleum oil; concentrated solutions in organic emulsifying agents, to be mixed with water, and applied as dilute emulsions; mixtures with dry powders, with added wetting agents, to be applied as water suspensions; mixtures with dry powders such as silica gel, hydrated alumina, calcium silicate and diatomaceous earth, to be applied as dusts; mixtures or solutions with propellant gases under pressure to be applied as aerosols; mixtures or solutions in paints, polishes, etc., and mixtures or solutions for impregnating fabrics, paper, etc.

The various dust diluents, solvents, emulsifiers, i. e., anion active, cation-active, and nonionic soaps, spreading agents, penetrating agents, sticking and stabilizing agents normally employed in the preparation of the above formulations are well known and no difficulty will be encountered by those skilled in the art in the preparation of effective insecticides while using the compounds of the present invention.

I claim:
1. N-methylsulfonyl-benzylsulfonanilides having the following general formula:

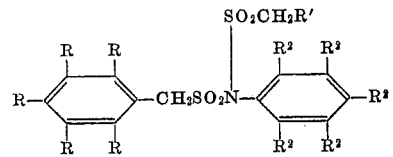

wherein R, R' and $R^2$ represent a member selected from the class consisting of hydrogen and chlorine, wherein at least one R and one $R^2$ represent chlorine.

2. A compound having the following formula:

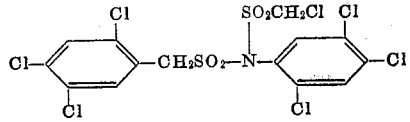

3. A compound having the following formula:

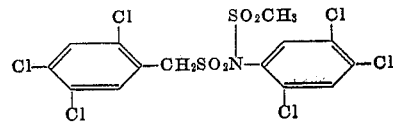

4. A compound having the following formula:

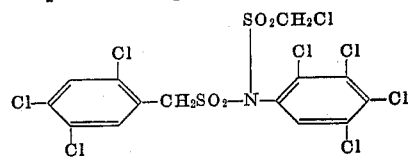

5. A compound having the following formula:

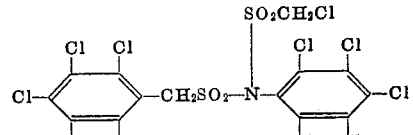

6. A compound having the following formula:

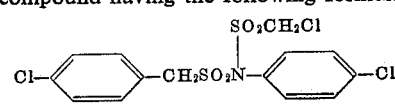

References Cited in the file of this patent

Marvel: J. Am. Chem. Soc., vol. 48, pp. 2943–4 (1926).

Marvel et al.: J. Am. Chem. Soc., vol. 51, pp. 1272–4 (1929).

Johnson: J. Am. Chem. Soc., vol. 63, pp. 1571–2 (1941).